Patented Feb. 21, 1950

2,498,217

UNITED STATES PATENT OFFICE 2,498,217

CHLORINATED ISOMELAMINES

Daniel E. Nagy, Stamford, and Donald W. Kaiser, Riverside, Conn., assignors to American Cyanamid Company, New York, N. Y., a corporation of Maine No Drawing. Application March 9, 1945, Serial No. 581,944

5 Claims. (Cl. 260—239.6)

This invention relates to new organic compounds and to a method of preparing the same. More particularly, it relates to halogenated derivatives of mono - substituted - isomelamines which compounds contain a relatively high proportion of available halogen and possess other desirable physical and chemical characteristics.

In our copending application, Serial No. 554,155, filed September 14, 1944, now Patent No. 2,481,758, September 13, 1949, we disclose and claim as new compounds mono-substituted-isomelamines and their preparation. These new compounds which have the general formula

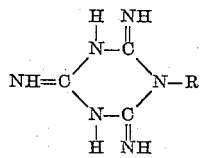

in which R is an aromatic or aliphatic radical are prepared by reacting a primary amine with 1,3-dicyanoguanidine in the presence of a strong acid. The resulting compounds which may be more accurately designated 2,4,6 - triimino-1-aliphatic (or aromatic) hexahydromelamines have the aliphatic or aromatic substituent group directly attached to a nitrogen atom of the heterocyclic ring. They are, as a class, rather strong bases, insoluble in cold water and most organic solvents. They readily form acid addition salts which are neutral and somewhat water-soluble. The free bases and their salts are relatively stable and melt with decomposition at fairly high temperatures.

We have now discovered that the mono-substituted-isomelamines of the aforesaid application may be chlorinated to yield new compounds having unusual and useful properties. The chlorinated isomelamines of the present invention may contain from about 25% to 40% by weight of available chlorine, depending upon the conditions and extent of the chlorination. Depite this relatively high chlorine content, they are very stable at temperatures below their decomposition point. At high temperatures they decompose with explosive violence.

As a class, the chlorinated isomelamines are insoluble or difficultly soluble in water. This latter property may be employed to great advantage in the use of these compounds in the sterilization of water. Our compounds have a low solubility in water, and the accidental or deliberate addition of an excess of the chlorinated compound to drinking water will not result in excessive release of chlorine or the addition to the water of unnecessarily large amounts of undesirable chemical substances. As the compounds are stable, they will continue to hold their available chlorine for a long period of time under conditions at which other less stable chlorine-containing compounds soon decompose and give up their available chlorine. As will be apparent, therefore, the chlorinated isomelamines of the present invention may be used to furnish a dependable, prolonged and adequate, but not excessive, supply of chlorine to drinking water with the minimum care in their use. Obviously, these compounds may also be used for other purposes requiring a stable, long-lasting source of available chlorine.

The mono-substituted-isomelamines may be chlorinated in the dry state, in aqueous suspension or dissolved or suspended in an organic liquid. When the chlorination is conducted with the isomelamine in solid phase it is preferable to first reduce the solid material to a relatively fine particle size, for example, less than about 100 mesh, so that chlorination is more readily and completely brought about.

The chlorination may be effected by means of any of the common chlorinating agents, such as elemental chlorine, hypochlorous acid, hypochlorites or other chlorinating agents known to those in the art. A preferred method is to bubble chlorine gas through an aqueous suspension of the finely divided isomelamine.

The temperature of the chlorination may vary widely, from 0° to about 100° C. Ordinarily, we chlorinate the compounds at room, or slightly lower, temperatures.

The time required for the chlorination will depend upon several factors including the amount of chlorine that is desired in the product, the temperature, the rate at which chlorine is supplied to the reaction, hydrogen ion concentration, the particular isomelamine to be chlorinated, etc.

We may use either the free isomelamine base or the acid salts of these compounds. When using the latter, it is preferable to carry out the reaction in the presence of an acid acceptor, such as sodium carbonate or a buffer, such as sodium acetate, which will react with the free acid liberated during the chlorination, and prevent the accumulation of excess amounts of strong acid in the reaction mixture.

Any of the mono-substituted-isomelamines described in our aforementioned copending application may be chlorinated in accordance with the present invention to yield new and useful compounds. Among those mono-substituted-isomelamines that may be employed may be specifically mentioned phenyl isomelamine, p-ethoxyphenyl isomelamine, ortho-bromophenyl isomelamine, 2,5-dichlorophenyl isomelamine, ortho-hydroxyphenyl isomelamine, p-arsonophenyl isomelamine, 2-methyl-4-isopropylphenyl isomelamine, ortho-tolyl isomelamine, p-sulfonamidophenyl isomelamine, alpha-naphthyl isomelamine, p-aminophenyl isomelamine, p-sulfophenyl isomelamine, butyl isomelamine, ethyl isomelamine, lauryl isomelamine, and others described and claimed in our copending application. Of course, the physical properties of the chlorinated compounds will vary according to the particular isomelamine chlorinated.

The invention will now be illustrated by means of the following examples in which representative mono-substituted-isomelamines are prepared and chlorinated. It is understood, of course, that these examples are intended to illustrate but not limit the invention. All parts are by weight unless otherwise specified.

of boiling water, the hot solution was poured into a stirred solution of 82 g. (1.0 mol) of anhydrous sodium acetate in 400 cc. of water. When the finely divided slurry reached room temperature, chlorine was admitted and chlorination continued until an excess of halogen was present. The very light yellow solid was filtered and washed well with water. Analysis by addition of potassium iodide to a chloroform-acetic acid solution followed by titration with an aqueous standard sodium thiosulfate solution disclosed that the product had an available chlorine content of 38.6%.

A quantity of p-sulfonamidophenyl normal melamine was prepared and the product chlorinated similarly to the chlorination of the isomelamine. The two chlorinated products were then compared with the following results:

*Table*

| Name | p-Sulfonamidophenylisomelamine | p-Sulfonamidophenyl normal melamine |
|---|---|---|
| Structure | (structure shown) | (structure shown) |
| Melting Point of Free Base, °C | 272–273 | 271–273 |
| Percent Available Chlorine | 38.6 | 37.4 |
| Decomposition Point of Chlorinated Product, °C | 200 | 130–140 |
| Per Cent Loss of Cl after Heating a Dry Sample at 150° for 3 Hrs. | 6.95 | Not carried out because of low decomposition point. |
| Per Cent Loss of Cl After Refluxing in Water for 5 Hrs. | 2.6 | 92.5 |

As will be apparent from the foregoing results, the chlorinated isomelamine is a much more stable product than the corresponding normal melamine even though it contains more chlorine.

*Example 2*

A mixture of 234 g. (1.0 mol) of potassium 1,3-dicyanoguanidine which contained a molar equivalent of potassium chloride, 191 g. (1.0 mol) of sulfanilic acid monohydrate, and 500 cc. of water was stirred and heated on a steam bath. At 85° C. almost complete solution occurred and then finely divided solid began to separate. 100 g. (1.0 mol) of concentrated hydrochloric acid was then slowly added and the temperature gradually climbed to 104°. After addition, the mixture was cooled in an ice bath, the colorless solid filtered, washed with ice water, and dried in an oven at 110°. The yield of infusible p-sulfophenylisomelamine was 244 g. or 86.5% of the theoretical.

A suspension of 14.1 g. (0.05 mol) of p-sulfophenylisomelamine in 300 cc. of water was vigorously stirred and chlorine bubbled into the slurry. Within a short time, the mixture became acidic and a solution of 16.4 g. (0.20 mol) of anhydrous sodium acetate in 50 cc. of water was slowly added so that the slurry remained acid at all times. Before all of the sodium acetate was added a pale yellow solution formed, but as soon as excess chlorine became present nearly colorless solid separated. The material was very finely divided and had a silvery sheen characteristic of sulfonic acids. After filtering, the solid was washed with water and placed damp in a bottle. A sample was dried in an Abderhalden pistol with acetone. Decomposition occurred at 196° C. when rapidly heated in a melting-point tube. Analysis, carried out in water, showed the

*Example 1*

A stirred mixture of 351 g. (1.50 mols) of 94.4% potassium dicyanoguanidine which contained an equal molar quantity of potassium chloride, 258 g. (1.50 mols) of sulfanilamide, and 400 cc. of water was heated to 85° and then slowly acidified with 300 g. (3.0 mols) of concentrated hydrochloric acid. A clear yellow solution resulted after about half of the acid was added and then solid began to separate. During acidification external heating was stopped and the temperature slowly climbed to 100°. After reaction was over, the mixture was cooled in an ice bath, the solid filtered, washed with ice water and dried in an oven at 80°. An 88% yield of product, decomposing at 330° was obtained. Crystallization from hot water raised the decomposition point of the p-sulfonamidophenylisomelamine hydrochloride to 333°. The free base was found to decompose at 272–273°.

After dissolving 63.5 g. (0.20 mol) of p-sulfonamidophenylisomelamine hydrochloride in a liter product to contain 31.3% of available chlorine. This product is not as stable as the chlorinated p-sulfonamidophenylisomelamine described in the preceding example, a dry sample of the product decomposing violently after heating for three minutes in an oven at 150° C.

*Example 3*

27 g. (0.25 mol) of p-phenylenediamine, 59 g. (0.25 mol) of potassium 1,3-dicyanoguanidine which contained a molar equivalent of potassium chloride and 150 cc. of water was heated on a steam bath. 50 cc. (0.59 mol) of concentrated hydrochloric acid which was diluted with water was then added slowly to the stirred mixture. When about two-thirds of the acid had been added the precipitate which was the dihydrochloride of phenylenediisomelamine began to form.

To a mixture of 1.63 g. of p-phenylenediisomelamine in 50 cc. of water was added chlorine gas and a 10% solution of sodium hydroxide, the pH being kept between 7 and 9 by the slow addition of the sodium hydroxide and the temperature between 6° and 8° C. After 16 cc. of the sodium hydroxide solution had been added the chlorine gas was bubbled through the red solution until it was neutral. The solution was then acidified with acetic acid whereupon there was obtained 2.4 g. of a precipitate which did not decompose up to a temperature of 290° C. On titration, the product was found to have an equivalent weight of 67 which indicated that approximately 3½ chlorine atoms were present in each molecule.

*Example 4*

A mixture of 550 g. (2.3 mols) of 92% crude potassium 1,3-dicyanoguanidine which contained a molar equivalent of potassium chloride, and 242 g. (2.6 mols) of aniline were placed in a 3-necked flask which was provided with a stirrer, thermometer, dropping funnel, and reflux condenser. In the meanwhile, 440 cc. (5.2 mols) of concentrated hydrochloric acid was diluted with 500 cc. of water and 250 cc. of this solution was added to the mixture in the flask. The contents of the flask was then stirred and heated to 85° before the remaining acid was slowly added. The temperature gradually rose to 105° and all but 10 cc. of the acid was required before the mixture became acidic to pH paper. After cooling in an ice bath, the solid was filtered, washed with a little water, then methanol and acetone, and dried in an oven at 75°. The product was light yellow in color, decomposed at 313°, and weighed slightly greater than the theoretical weight, which indicated contamination with potassium chloride. Crystallization from hot water, with charcoaling gave 442 g. or an 80.5% purified yield of glittering plates of phenylisomelamine hydrochloride which decomposed at 318°.

A solution of 47.7 g. (0.20 mol) of phenylisomelamine hydrochloride in 750 cc. of water was chlorinated until excess halogen was present. Granular solid separated from the strongly acidic solution and was washed with water and dried in a vacuum desiccator. The weight of the colorless solid, decomposing at 170° C., was 31 g. Analysis for chlorine showed that the product contained 31.6% of available chlorine.

*Example 5*

Chlorine gas was passed through a mixture of 4.04 g. of penylisomelamine, 5.3 g. of sodium carbonate, and 75 cc. of water while maintaining the temperature of the mixture at 6° to 8° C. until it was almost neutral. The reaction mixture contained 1.2 g. of insoluble chlorinated phenylisomelamine and acidification of the filtrate precipitated 3.4 g. of additional material. This latter product was found to decompose at 160° C. and contained about 2½ chlorine atoms per molecule.

*Example 6*

To 50 cc. of water were added 4.04 g. of phenylisomelamine and 2.72 g. of sodium acetate. Chlorine gas was then passed through the mixture which was maintained at 6° to 8° C. until the solution was almost neutral. A 10% solution of sodium hydroxide was then slowly added with the simultaneous addition of more chlorine gas while keeping the pH between 7 and 8. A total of 30 cc. of the sodium hydroxide (0.075 mol) was added and chlorine gas was passed into the solution for 3 to 4 minutes longer. The clear solution was then acidified with acetic acid, whereupon there was obtained 6.2 g. of pink precipitate which decomposed at 168 to 170° C. On analysis, the product was found to contain three chlorine atoms per molecule which is equivalent to 35% of available chlorine.

We claim:

1. Chlorinated mono-aromatic-substituted isomelamines having the formula

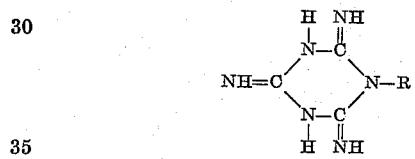

in which R is an aromatic radical and containing from about 25% to 40% by weight of available chlorine.

2. Chlorinated phenyl isomelamine having the formula

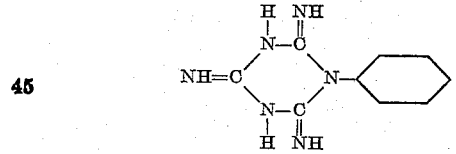

and containing from about 25% to 40% by weight of available chlorine.

3. Chlorinated p-sulfonamidophenyl isomelamine having the formula

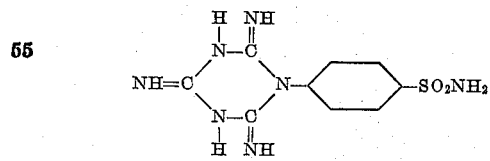

and containing from about 25% to 40% by weight of available chlorine.

4. A method of preparing chlorinated p-sulfonamidophenyl isomelamine having the formula

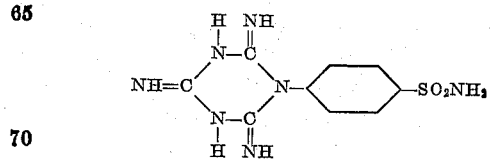

which comprises the step of contacting p-sulfonamidophenyl isomelamine with chlorine and recovering the chlorinated p-sulfonamidophenyl isomelamine.

5. A method of preparing chlorinated mono-aromatic-substituted-isomelamines having the formula

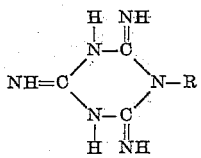

in which R is an aromatic radical which comprises passing chlorine gas through an aqueous suspension of a mono-aromatic-substituted-isomelamine until the product contains from 25% to 40% by weight of available chlorine and recovering the chlorinated isomelamine.

DANIEL E. NAGY.
DONALD W. KAISER.

REFERENCES CITED

The following references are of record in the file of this patent:

UNITED STATES PATENTS

| Number | Name | Date |
| --- | --- | --- |
| 2,184,883 | Muskat | Dec. 26, 1939 |
| 2,184,886 | Muskat | Dec. 26, 1939 |
| 2,184,888 | Muskat | Dec. 26, 1939 |
| 2,197,357 | Widmer | Apr. 15, 1940 |
| 2,299,069 | Chenicek | Oct. 20, 1942 |
| 2,392,607 | Nagy | Jan. 8, 1946 |
| 2,396,193 | Paden | Mar. 5, 1946 |
| 2,407,177 | Roblin | Sept. 3, 1946 |

OTHER REFERENCES

Beilstein, vol. 26, pp. 241 and 247, fourth edition.